(12) United States Patent
Kassaei et al.

(10) Patent No.: US 11,893,627 B2
(45) Date of Patent: Feb. 6, 2024

(54) ADAPTIVE RISK-BASED VERIFICATION AND AUTHENTICATION PLATFORM

(71) Applicant: eBay Inc., San Jose, CA (US)

(72) Inventors: Farhang Kassaei, Saratoga, CA (US); Amanda A. Earhart, Santa Cruz, CA (US); Snezana Sahter, San Jose, CA (US); Srinivasu Gottipati, Fremont, CA (US); Lars Wright, Campbell, CA (US); Craig Rowley, San Jose, CA (US); Lakshman Shyam Sundar Maddali, Sunnyvale, CA (US); Nainesh Nayudu, Santa Clara, CA (US)

(73) Assignee: EBAY INC., San Jose, CA (US)

( * ) Notice: Subject to any disclaimer, the term of this patent is extended or adjusted under 35 U.S.C. 154(b) by 841 days.

(21) Appl. No.: 16/561,866

(22) Filed: Sep. 5, 2019

(65) Prior Publication Data

US 2019/0392514 A1 Dec. 26, 2019

Related U.S. Application Data

(63) Continuation of application No. 15/818,126, filed on Nov. 20, 2017, now Pat. No. 10,489,853, which is a continuation of application No. 12/483,506, filed on Jun. 12, 2009, now Pat. No. 9,830,643.

(60) Provisional application No. 61/164,847, filed on Mar. 30, 2009.

(51) Int. Cl.
*G06Q 40/00* (2023.01)
*G06Q 10/00* (2023.01)
*G06Q 30/0601* (2023.01)

(52) U.S. Cl.
CPC ............ *G06Q 40/00* (2013.01); *G06Q 10/00* (2013.01); *G06Q 30/0601* (2013.01)

(58) Field of Classification Search
None
See application file for complete search history.

(56) References Cited

U.S. PATENT DOCUMENTS 8,280,782 B1 * 10/2012 Talreja ................... G06Q 30/00
705/26.4
9,830,643 B2 11/2017 Kassaei et al.
10,489,853 B2 11/2019 Kassaei et al.
(Continued)

OTHER PUBLICATIONS

U.S. Appl. No. 12/483,506 U.S. Pat. No. 9,830,643, filed Jun. 12, 2009, Adaptive Risk-Based Verification and Authentication Platform.
(Continued)

*Primary Examiner* — Jason M. Borlinghaus
(74) *Attorney, Agent, or Firm* — SCHWEGMAN LUNDBERG & WOESSNER, P.A.

(57) ABSTRACT

In various exemplary embodiments, a system and associated method to perform an adaptive risk-based assessment of a user is disclosed. A method includes receiving a request from a user to perform an action at an electronic marketplace, retrieving a plurality of risk assessment factors associated with the action and the user, performing a risk assessment process on the risk assessment factors to identify a risk mitigation process, requesting that the user perform the identified risk mitigation process, and allowing the user to perform the action in response to the user completing the risk mitigation.

19 Claims, 6 Drawing Sheets

(56) References Cited

U.S. PATENT DOCUMENTS

| | | | | |
|---|---|---|---|---|
| 2001/0049657 | A1* | 12/2001 | Wang | G06Q 30/0601 |
| | | | | 705/40 |
| 2002/0138371 | A1 | 9/2002 | Lawrence et al. | |
| 2003/0033240 | A1* | 2/2003 | Balson | G06Q 40/06 |
| | | | | 705/37 |
| 2005/0289039 | A1* | 12/2005 | Greak | G06Q 40/04 |
| | | | | 705/37 |
| 2010/0250387 | A1 | 9/2010 | Kassaei et al. | |
| 2010/0256999 | A1* | 10/2010 | Ghani | G06Q 30/08 |
| | | | | 705/7.31 |
| 2018/0082364 | A1 | 3/2018 | Kassaei et al. | |

OTHER PUBLICATIONS

U.S. Appl. No. 15/818,126 U.S. Pat. No. 10,489,853, filed Nov. 20, 2017, Adaptive Risk-Based Verification and Authentication Platform.
Final Office Action received for U.S. Appl. No. 15/818,126, dated May 6, 2019, 7 pages.
First Action Interview Pre-Interview Communication received for U.S. Appl. No. 15/818,126, dated Oct. 3, 2018, 5 pages.
First Action Interview-Office Action Summary received for U.S. Appl. No. 15/818,126, dated Feb. 13, 2019, 3 pages.
Notice of Allowance received for U.S. Appl. No. 15/818,126, dated Jul. 22, 2019, 7 pages.
Preliminary Amendment filed for U.S. Appl. No. 15/818,126, dated Jan. 22, 2018, 2018, 7 pages.
Response to Final Office Action filed Jun. 27, 2019 for U.S. Appl. No. 15/818,126, dated May 6, 2019, 7 pages.
Response to First Action Interview—Office Action Summary filed Apr. 17, 2019, for U.S. Appl. No. 15/818,126, dated Feb. 13, 2019, 9 pages.
Response to First Action Interview—Pre-Interview Communication filed Nov. 5, 2018, for U.S. Appl. No. 15/818,126, dated Oct. 3, 2018, 4 pages.
Advisory Action received for U.S. Appl. No. 12/483,506, dated Mar. 16, 2012, 3 pages.
Appeal brief for U.S. Appl. No. 12/483,506, filed Jul. 5, 2012, 23 pages.
Appeal Decision received for U.S. Appl. No. 12/483,506, mailed on Nov. 16, 2015, 7 pages.
Applicant Initiated Interview Summary received for U.S. Appl. No. 12/483,506, dated Jun. 20, 2017, 2 pages.
Applicant Initiated Interview Summary received for U.S. Appl. No. 12/483,506, dated Feb. 22, 2017, 3 pages.
Decision on Pre-Appeal Brief Request for U.S. Appl. No. 12/483,506, mailed on May 4, 2012, 2 pages.
Examiner initiated Interview Summary received for U.S. Appl. No. 12/483,506, dated Aug. 11, 2017, 1 page.
Examiner's Answer to Appeal Brief received for U.S. Appl. No. 12/483,506, dated Aug. 17, 2012, 13 pages.
Final Office Action received for U.S. Appl. No. 12/483,506 dated Oct. 6, 2011, 14 pages.
Final Office Action received for U.S. Appl. No. 12/483,506, dated Nov. 2, 2016, 11 pages.
Non-Final Office Action received for U.S. Appl. No. 12/483,506, dated Apr. 5, 2017, 10 pages.
Non-Final Office Action received for U.S. Appl. No. 12/483,506, dated Apr. 19, 2016, 12 pages.
Non-Final Office Action received for U.S. Appl. No. 12/483,506, dated Jul. 5, 2011, 12 pages.
Notice of Allowance received for U.S. Appl. No. 12/483,506, dated Jul. 26, 2017, 8 pages.
Pre-Appeal Brief Request for U.S. Appl. No. 12/483,506, filed Apr. 4, 2012, 5 pages.
Response to Final Office Action filed Mar. 2, 2017 for U.S. Appl. No. 12/483,506, dated Nov. 2, 2016, 15 pages.
Response to Final Office Action filed Mar. 6, 2012 for U.S. Appl. No. 12/483,506, dated Oct. 6, 2011, 17 pages.
Response to Non-Final Office Action filed Aug. 19, 2016 for U.S. Appl. No. 12/483,506, dated Apr. 19, 2016, 16 pages.
Response to Non-Final Office Action filed Jun. 30, 2017 for U.S. Appl. No. 12/483,506, dated Apr. 5, 2017, 9 pages.
Response to Non-Final Office Action filed Sep. 12, 2011 for U.S. Appl. No. 12/483,506, dated Jul. 5, 2011, 14 pages.
IP Address Location, "Find IP Address with My Lookup Locator", Retrieved from the internet URL :<http://web.archive.org/web/2007406174807/http://ipaddressiocation.org>, Apr. 6, 2007, 2 pages.
"411.com-Home Page", retrieved from the internet URL: <http://www.411.com/> on Jul. 27, 2017, 1998-2017, 1 page.
Kassaei, "Adaptive, Risk Based Verification Platform to Multi-Seller Marketplaces", A White Paper, Mar. 26, 2009, 15 pages.
U.S. Appl. No. 12/483,506, filed Jun. 12, 2009, Issued.
U.S. Appl. No. 15/818,126, filed Nov. 20, 2017, Allowed.

* cited by examiner

US 11,893,627 B2

ADAPTIVE RISK-BASED VERIFICATION AND AUTHENTICATION PLATFORM

RELATED APPLICATIONS

This application is a continuation of and claims the benefit of priority to U.S. patent application Ser. No. 15/818,126, filed Nov. 20, 2017, which is a continuation of and claims the benefit of priority to U.S. patent application Ser. No. 12/483,506, filed on Jun. 12, 2009, which claims the priority benefit of U.S. Provisional Patent Application No. 61/164,847 filed Mar. 30, 2009, each of which is hereby incorporated by reference in its entirety.

TECHNICAL FIELD

The present application relates generally to the field of computer technology and, in a specific exemplary embodiment, to a system and method of determining a level of risk of a user and actions associated with the user and limiting access of higher-risk users and the associated actions.

BACKGROUND

In a multi-seller electronic marketplace, a plurality of sellers can list its inventory and buyers can purchase either portions of the inventory or the entire inventory (through, for example, either an auction of fixed price or various other formats). A risk in this environment is generally defined as a financial loss that a party can incur as a result of participation in market activities. Typical main categories of risks taken by the sellers include non-performing buyers, fraudulent buyer activities, returns, and charge-backs.

Examples of risks buyers potentially incur by participation in the electronic marketplace include fraudulent sellers (e.g., an item not being received), or simply dishonest sellers (e.g., the seller intentionally providing an inaccurate description of an inventory or providing a misleading description of the inventory placed for auction or sale).

Operators of electronic marketplaces attempt to mitigate and minimize risk to all participants in the marketplace, especially if the marketplace operator takes on the risk on behalf of, for example, buyers by providing various types of financial guarantees. Consequently, the marketplace operator must actively determine and mitigate risk.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
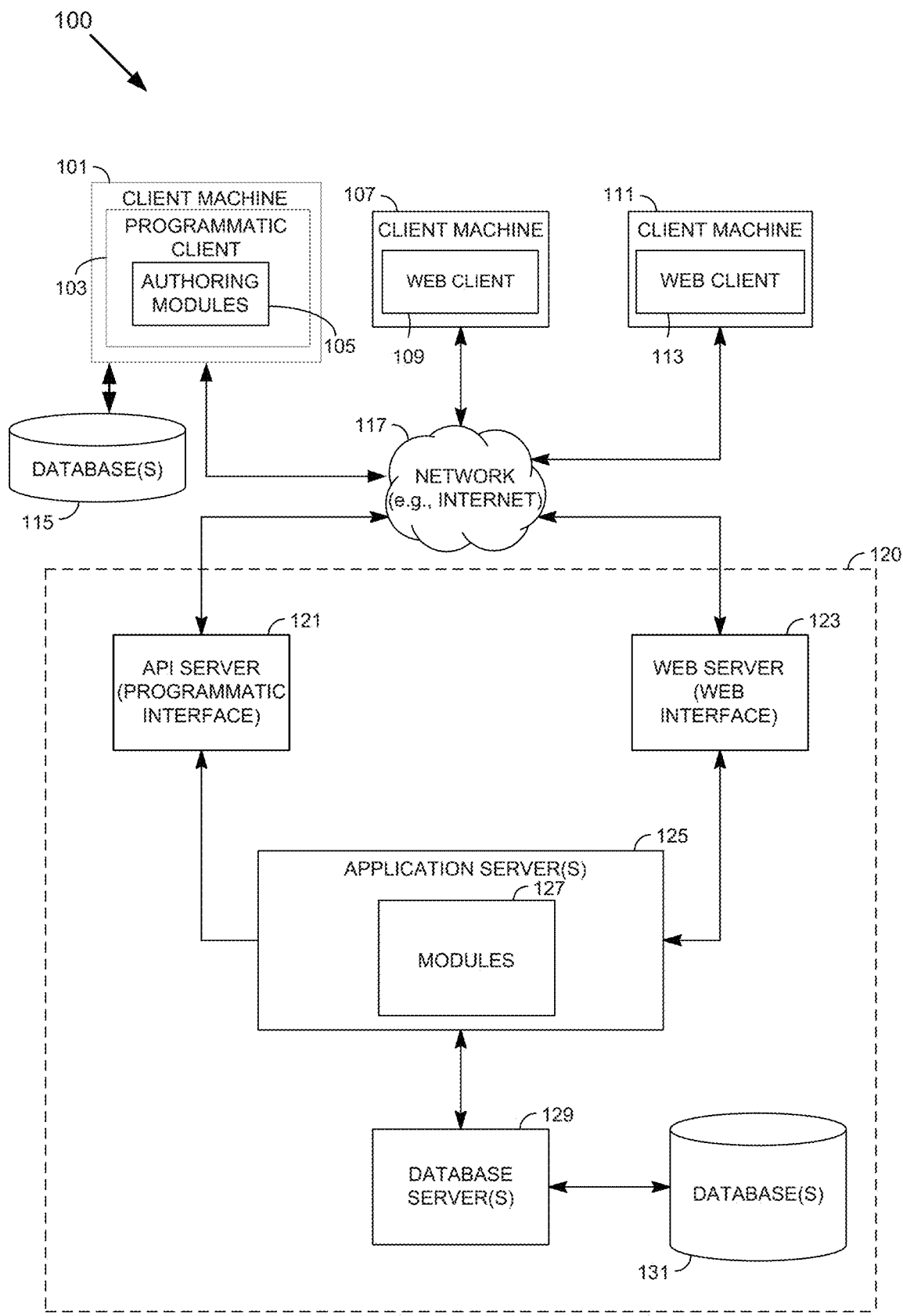
FIG. 1 is a block diagram illustrating an exemplary embodiment of a high-level client-server-based network architecture diagram depicting a system used to process end-user queries.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on an electronic marketplace environment, the embodiments are given merely for clarity in disclosure. Thus, any type of electronic commerce or electronic business system and method, including various system architectures, may employ various embodiments of the adaptive risk-based verification system and method described herein and is considered as being within a scope of the present invention.

In an exemplary embodiment, a system and method to perform an adaptive risk-based assessment of a user attempting participation in an electronic marketplace is disclosed. The user can be, for example, either a buyer or seller seeking to participate in an on-line auction. Since a certain level of risk to the other party (i.e., from the seller to the buyer or vice versa) or from the user to the on-line auction can occur, some type of verification process and risk assessment of both the user and the items to be sold or bid upon are determined. Once the verification process and risk assessment has been determined, a feedback loop continually updates the system or method to reduce an overall level of risk in the electronic marketplace.

The exemplary method can include assigning a risk assessment process associated with the user, using a plurality of assessment factors in the risk assessment process, determining whether to allow the user to perform an action in the electronic marketplace based on a response of the user to the plurality of assessment factors, performing a post-action analysis of the risk assessment process, and based upon a result of the post-action analysis, modifying the risk assessment process.

In another exemplary embodiment, a machine-readable storage medium including a plurality of instructions that, when executed by one or more processors, causes at least one of the one or more processors to perform a method to perform an adaptive risk-based assessment of a user attempting participation in an electronic marketplace. The method can be the exemplary method described above or immediately below.

In another exemplary embodiment, another method to perform an adaptive risk-based assessment of a user attempting participation in an electronic marketplace is disclosed. The method comprises assigning a risk assessment process associated with the user, using a plurality of assessment factors in the risk assessment process, determining whether to allow the user to participate in the electronic marketplace based upon the plurality of assessment factors, determining a risk mitigation process to be performed by the user to mitigate a level of risk associated with participation in the electronic marketplace, performing a post-action analysis of the risk assessment process and the risk mitigation process, and based upon a result of the post-action analysis, modifying at least the risk assessment process.

In another exemplary embodiment, a system to perform an adaptive risk-based assessment of a user in an electronic marketplace is disclosed. The system can be based upon a number of hardware platforms, such as servers or distributed systems, known independently in the art. The exemplary system comprises a risk verification platform having one or more processors to determine both an initial level of risk and a verification of the level of risk associated with the user. The risk verification platform includes a risk assessment engine to assign a risk assessment process to the user and a risk mitigation engine coupled to the risk assessment engine to provide a plurality of assessment factors to the risk assessment process. The plurality of assessment factors are based upon both the user and one or more actions the user may perform. Additionally, a determination engine is coupled to the risk mitigation engine to allow the user to perform an action in the electronic marketplace based on a response of the user to the plurality of assessment factors. A post-action analysis engine, coupled to the determination engine, performs an analysis of the risk assessment process and a feedback loop, coupled to the post-action analysis engine, the determination engine, and the risk assessment engine, modifies the risk assessment process based on a determination of the post-action analysis. Each of these exemplary embodiments, and others, are discussed in detail, below.

With reference to FIG. 1, a high-level network diagram of an exemplary embodiment of a system 100 with a client-server architecture includes a first client machine 101, a second client machine 107, a third client machine 111, a network 117 (e.g., the Internet), and an information storage and retrieval platform 120. In this embodiment, the information storage and retrieval platform 120 constitutes a commerce platform or commerce server and provides server-side functionality, via the network 117, to the first 101, second 107, and third 111 client machines. A programmatic client 103 in the form of authoring modules 105 executes on the first client machine 101. A first web client 109 (e.g., a browser, such as the Internet Explorer browser developed by Microsoft Corporation of Redmond, Wash.) executes on the second client machine 107. A second web client 113 executes on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 facilitating access to one or more information storage databases 131. The one or more modules 127 provide a number of information storage and retrieval functions and services to users accessing the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in, for example, a distributed, or peer-to-peer, architecture system. The one or more modules 127 and the authoring modules 105 may also be implemented as stand-alone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 is, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 can include, as previously indicated, the authoring modules 105 used to author, generate, analyze, and publish domain rules and aspect rules. The domain and aspect rules are used in the information storage and retrieval platform 120 to structure the data items and transform queries. Such domain and aspect rules are known independently in the art.

Figure 2:
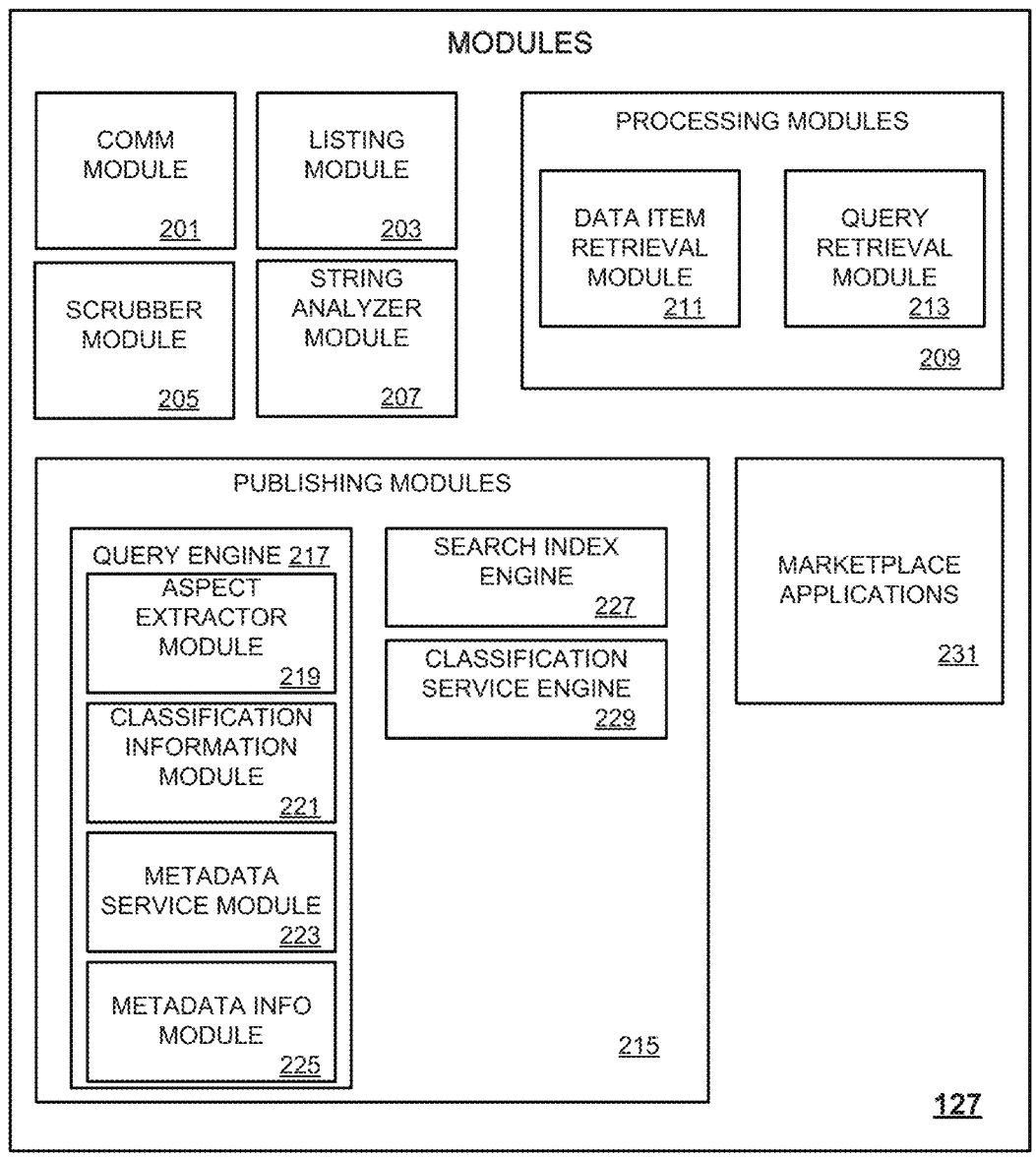
FIG. 2 is a block diagram illustrating an exemplary embodiment of various modules of the network architecture of FIG. 1.

Referring now to FIG. 2, an exemplary block diagram of the one or more modules 127 of FIG. 1 includes a communication module 201, a listing module 203, a scrubber module 205, a string analyzer module 207, a plurality of processing modules 209, and a plurality of publishing modules 215. The one or modules 127 further includes a marketplace applications block 231.

The communication module 201 receives a query from one or more of the client machines 101, 107, 111 (FIG. 1). The query includes one or more constraints (e.g., keywords, categories, or information specific to a type of data item). The communication module 201 interacts with a query engine 217 and a search index engine 227, both located in the plurality of publishing modules 215, to process the query. In conjunction with the query engine 217 and the search index engine 227, the communication module 201 attempts to extract aspect-value pairs (e.g., brand="Donna Karan") based on the query. Details of the aspect-value pairs are described in more detail, below.

The plurality of publishing modules 215 publishes new or existing rules, as discussed above with reference to FIG. 1, to the information storage and retrieval platform 120, thereby enabling the rules to be operative (e.g., applying the rules to data items and queries). In a specific exemplary embodiment, the information storage and retrieval platform 120 of FIG. 1 may be embodied as a network-based marketplace that supports transactions of data items or listings (e.g., goods or services) between sellers and buyers. One such marketplace is eBay, The World's Online Marketplace®, developed by eBay Inc., of San Jose, Calif. In this embodiment, the information storage and retrieval platform 120 receives information from sellers describing the data items. The data items are subsequently retrieved by potential buyers or bidders. The one or more modules 127 include the marketplace applications block 231 to provide a number of marketplace functions and services to end-users accessing the information storage and retrieval platform 120.

The plurality of publishing modules 215 further includes a classification service engine 229. The classification service engine 229 applies domain rules to identify one or more domain-value pairs (e.g., product type=women's blouses) associated with the data item. The classification service engine 229 further applies the aspect rules to identify aspect-value pairs associated with the data item. The classification service engine 229 applies the domain and aspect rules to data items or listings as they are added to the information storage and retrieval platform 120 or responsive to the publication of new rules (e.g., domain rules or aspect rules). The scrubber module 205 utilizes services of the classification service engine 229 to structure the item information in the data item (e.g., the classification service engine 229 applies domain and aspect rules). The classification service engine 229 then pushes or publishes item search information over a bus (not shown but implicitly understood by a skilled artisan) in real time to the search index engine 227.

The search index engine 227 includes search indexes and data item search information (e.g., including data items and associated domain-value pairs and aspect-value pairs). The search index engine 227 receives the transformed query from the communication module 201 and utilizes the search indexes to identify data items based on the transformed query. The search index engine 227 communicates the found data items to the communication module 201.

A query retrieval module 213, within the plurality of processing modules 209, receives information from one or more of the client machines 101, 107, 111 and stores the information as a data item in the one or more information storage databases 131 (FIG. 1). For example, an end-user, acting as a seller and operating on one of the client machines, enters descriptive information for the data item to be offered for sale or auction through the information storage and retrieval platform 120.

The plurality of processing modules 209 receives classification information and metadata information associated with the data item. The information is published to, for example, a local backend server (not shown) hosting the query engine 217, the search index engine 227, and the classification service engine 229.

The plurality of processing modules 209 further includes a data item retrieval module 211 to receive requests for data items from a client machine. For example, responsive to receiving a request, the data item retrieval module 211 reads data items from the data item information stored on the one or more information storage databases 131 (FIG. 1) and stores the data items as sample information in the one or more databases 115 for access by the client machine. Responsive to receiving the request, the query retrieval module 213 reads queries from the sample information and communicates the queries to the client machine.

The string analyzer module 207 receives requests from the first client machine 101 to identify candidate values to associate with an aspect. The request may include the aspect and one or more values that have been associated with the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," or "tint"), a commonly misspelled form (e.g., "collor"), or an acronym form.

A database (not shown specifically) used by the string analyzer module 207 includes queries or data items that have been entered by a user (e.g., buyer or seller, respectively although a seller may wish to enter queries as well) to the information storage and retrieval platform 120. The database can also store or reference dictionaries, thesauruses, or other reference sources. The string analyzer module 207 analyzes the strings of text to identify candidate values to associate with the aspect. More examples of query strings and searching techniques are given, below.

The query engine 217 includes an aspect extractor module 219, a classification information module 221, a metadata service module 223, and a metadata information module 225. The aspect extractor module 219 receives a query from the communication module 201 and applies aspect rules to extract aspect-value pairs from the query. Further, the aspect extractor module 219 communicates the query received from the communication module 201 to the plurality of processing modules 209 that stores the query as sample query information.

The classification information module 221 includes phrases from a plurality of past searches to reference against the query. For example, synonyms or related information for a query can be stored in the classification information module 221 to aid a user in locating an item or a particular set of items.

The metadata service module 223 communicates descriptive metadata information to the communication module 201 based on a query received from the communication module 201. The metadata information is retrieved from the metadata information module 225 and includes metadata that the communication module 201 uses to format and generate a user interface to provide additional information to the user based on the original user-generated query.

Once aspect-value pairs, classification information, and other relevant information is retrieved through, for example, either the data item retrieval module 211 or the query retrieval module 213, the listing module 203 provides additional assistance to a user listing the data item. The additional assistance can be, for example, one or more interfaces for the user to upload photographs, textual descriptions, and bidding information.

Although the one or more modules 127 have been defined in terms of a variety of individual modules and engines, a skilled artisan will recognize that many of the items can be combined or organized in other ways. The description given herein simply provides an exemplary embodiment to aid the reader in an understanding of the systems and methods used herein.

Application of Embodiments of the Adaptive Risk-Based Verification and Authentication Platform into the Exemplary Network Architecture One purpose of various exemplary embodiments of the verification platform described herein is to estimate and mitigate the risk posed by sellers to buyers. Although many electronic marketplaces do not verify buyers for a level of risk the buyers may pose to sellers, the systems and methods discussed herein are equally applicable to verification of any type of user as a member of an electronically-based group. Consequently, for clarity in presentation, the discussion will be based upon mitigating a risk posed by sellers to buyers.

Frequently, the marketplace operator (e.g., eBay Inc., discussed above) compensates a buyer should the buyer incur losses as a result of marketplace participation. Thus, any risk posed by sellers to buyers becomes a risk to the marketplace operator as well as the buyer.

Figure 3:
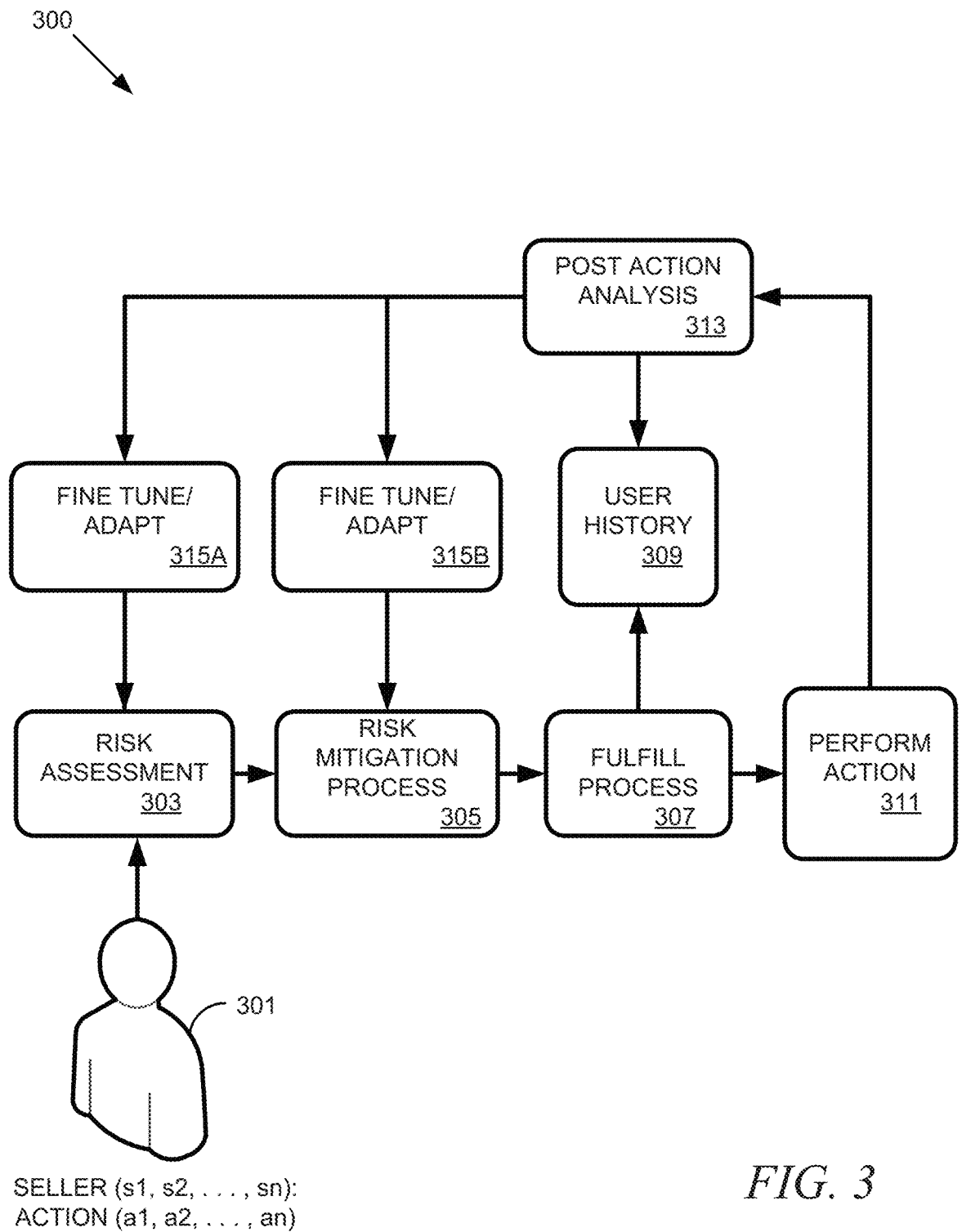
FIG. 3 is a block diagram illustrating an exemplary adaptive system usable with the network architecture of FIG. 1.

Referring now to FIG. 3, an exemplary adaptive system 300 generally acts as a closed-loop system to determine, mitigate, and adapt to a level of risk posed by one or more sellers. Although shown as a type of flowchart, a skilled artisan will recognize that each operation may be performed on, for example, a hardware-based engine or module. As will be recognizable to a skilled artisan upon reading the disclosure given herein, the hardware-based engine or module could take the form of, for example, one or more processors, a floating point gate array (FPGA), an application specific integrated circuit (ASIC) device, or various combinations thereof.

The exemplary adaptive system 300 starts with a seller 301 visiting an electronic marketplace and performing an action. For example, the seller may attempt to perform a particular action, such as selling an item (i.e., a SELL action). Each seller in the exemplary adaptive system 300 has a set of attributes denoted by $s_1, s_2, \ldots, s_n$. Attributes of the seller 301 can include, for example, the full name, mailing address, phone number(s), types of phone number (e.g., landline, cell, VOIP), connecting IP address, the set of internet hubs traversed to reach the electronic marketplace (as determined by HTTP XFF headers), and e-mail address of the seller 301. Additionally, if the seller 301 has used this particular electronic marketplace in the past, the attributes of the seller 301 can further include feedback and detailed seller rating (DSR) scores, years the seller 301 has participated in this electronic marketplace, and an authentication context (e.g., a two-factor authentication (2FA—known independently in the art)), or that the seller 301 is a known-good seller.

Since the seller 301 intends to perform the action in the electronic marketplace, the action, in turn, has its own set of attributes. For example the action "SELL" generally has attributes $a_1, a_2, \ldots, a_n$. The attributes $a_1, a_2, \ldots, a_n$ can include, for example, the item (such as a product or service) being sold, a category for the item, a price, a description of the item, a total amount of gross merchandise value (GMV) listed for sale by the seller 301, a listing site, and the home site of the seller 301.

The exemplary adaptive system 300 first performs a risk assessment 303. The risk assessment 303 determines a combined risk of the seller and the action. In certain situations, such as during some registration scenarios, the action is unknown. For example, a user simply would like to register as a seller with no item to list. In this case, the exemplary adaptive system 300 assesses the risk based on attributes of the seller 301 alone. (Risk assessment, generally, is discussed in more detail, below.) A result or outcome of the risk assessment 303 is a discreet function of several values referred to as the risk domain. The result may be based upon a first algorithm built into either hardware, software, or firmware of the exemplary adaptive system 300. The first algorithm takes the attributes into account and is determined in a variety of ways such as a binary value (e.g., LOW or HIGH), a tertiary value (e.g., LOW, MED, or HIGH), or with a larger set of risk categories (e.g., 1, 2, . . . , 10). An additional algorithm uses a result of the risk assessment 303 as an input and makes a determination which of one or more risk mitigation processes 305, if any, the seller 301 must perform or satisfy to mitigate the risk the seller 301 poses to the electronic marketplace.

For example, a seller assessed to be a high risk in Germany who wants to sell on the electronic marketplace has to fulfill a risk mitigation process 305. The risk mitigation process includes three additional steps including placing a verified e-mail address on file with the market operator, placing a credit card on file with the market operator, and completing a German Postal Id Verification process in which the German post office asserts the identity and address of the seller by verifying the seller's passport. Depending upon laws in different geographical regions of the world, of course, such procedures may not be allowed.

Once the risk mitigation process 305 is completed, the exemplary adaptive system 300 records a history 309 of the seller 301 performing or fulfilling a process 307 in a determination engine. The seller 301 is then allowed to perform the action 311 (i.e., sell items in the electronic marketplace). Fulfilling the process, as determined by the determination engine, and allowing the seller 301 to perform the action 311, comprise at least a portion of a forward branch of the exemplary adaptive system 300 of FIG. 3.

Once the seller 301 lists the item and interacts with one or more buyers (e.g., through activities such as communications, transactions, shipping, post sales activities, and so on), a result of the interactions are captured and recorded (e.g., in a database) by the electronic marketplace. The interaction results can occur through one or more channels including, for example, buyer's feedback, customer support, automatic detection of fraud, or an investigation performed by the electronic marketplace operator.

The interaction results are fed into a feedback loop including a post action analysis subsystem 313. In a specific exemplary embodiment, the post action analysis subsystem 313 analyzes two main factors: (1) whether the initial risk assessment 303 was correct; and (2) whether the risk mitigation process 305 was adequate. Based on a result of the post action analysis subsystem 313, algorithms or determinations associated with either or both the risk assessment 303 and the risk mitigation process 305 described above are fine tuned and adapted through a fine tuning and adaptation feedback process 315A, 315B.

Risk Assessment and Risk Mitigation

In an exemplary embodiment, risk assessment is a non-linear mapping function between attributes of the seller, attributes of the action, and discrete values of the risk domain (e.g., such as (LOW, MED, HIGH) or (0, 1, 2, . . . , 10) as discussed above). The mapping function can be based on historical probabilities of adverse activities, heuristic rules, and absolute risk.

For example, an electronic marketplace often maintains a record of historical probabilities that includes a large set of data relating activities of a plurality of sellers over a long time period. The risk assessment process calculates the probability of incurring loss by assessing a historical record of a seller, if one exists, or any other history related to the seller including information related to sellers with only a brief history of selling in certain categories.

Heuristic rules are frequently ad hoc rules that can change based on context and a result of operations. For example, if the system observes a certain threshold of adverse activities from a domain of IP addresses, certain classes of phone numbers, or other types of adverse activity, the system can create a rule that marks the activity with similar attributes as being a higher risk.

In certain cases, a determinant of risk is simply based on an absolute magnitude of risk (i.e., an absolute risk) as determined by a dollar value for which the marketplace may become liable. For example, a seller might be determined a high risk if total outstanding GMV on the electronic marketplace exceeds a given threshold. The threshold can be different depending on, for example, country, item, category, or combinations thereof.

A determination of risk mitigation includes various algorithms that help determine which process a seller can perform and complete to earn the privilege of performing the original intent (e.g., selling a certain high-value item) of the seller on the electronic marketplace site. The risk mitigation processes (sometimes referred to as remedies) are typically a sequence of one or more operations. Each operation may also entail a method. The determination of risk mitigation maps a risk level, action, and seller to a process. Each of the factors can contain a weighting and the factors can be combined in, for example, a linear or non-linear process or algorithm.

Risk_Mitigation (Risk, User, Action)→Process

In a specific exemplary embodiment, a HIGH risk user, who would like to perform a SELLing action in the electronic marketplace and who resides in CHINA (locale is an attribute of the seller) is requested to perform a set of one or more operations (e.g., placing a credit card number on file) prior to being allowed to list an item for sale. The set of operations for the seller in China may be different than requested of a similarly situated HIGH risk seller residing in the United States. Other processes or sets of operations are described, below.

Further, at any given time there may be several processes that can be assigned to a set of Risk, User, and Action factors. These processes can partially compete with each other in that one factor may partially or totally negate another factor. Alternatively, the factors can be partially or completely additive with respect to one another. Part of the adaptive characteristic of the system is to observe and finally select one process over another for a certain set of risk, action, and user attributes.

A process can be as simple as entering an e-mail address, checking the e-mail inbox, and clicking on a link sent to that email address. A relatively simple process, such as an e-mail verification, is generally used for LOW risk sellers who would like to perform a BUY action in most locales. In contrast, a process can be more complex such as contacting a customer support group of the electronic marketplace and providing a proof-of-ownership for an item to be listed for sale. The operation of contacting customer support is generally more likely for high value or unique items. In other cases, a determination of the risk mitigation process may conclude that the seller does not need to perform any action (since the required processes have already been completed). Thus, various forms of the risk mitigation determination algorithm assign a proper risk mitigation process given a particular combination of risk assessment, user, and action to be performed.

The risk mitigation process can therefore be fulfilled by the seller performing the risk mitigation process as determined through application of the algorithm. The process can, for example, be an automated process, such as verifying a credit card number of a seller. Alternatively, the process can be a manual process such as contacting customer support. Once the seller completes the requested process, information regarding the requested process and its completion can be marked and recorded in a database maintained by the electronic marketplace operator. Consequently, the fact that the seller completes a certain process is taken into account in a future risk assessment of the same seller. Thus, completing the process can automatically reduce the risk.

With reference again to FIG. 3, the post action analysis subsystem 313 collects results of the actions of all market participants (e.g., buyers and sellers). The results are compared against initial results of the risk assessment 303 and the mitigation processes 305 to which the seller 301 has already been subjected.

In another exemplary embodiment (not shown explicitly), for sellers the system collects feedback from buyers and detailed seller ratings (DSRs), any complaints to customer support for the seller, and whether or not the seller was suspended by the electronic marketplace operator. The system then compares these collected factors to the risk assessment and mitigation process to which the seller has already been subjected. The results can then be considered based on the classifications as shown in Table I, below.

TABLE I

| | | Result | |
|---|---|---|---|
| | | Not Suspended | Suspended |
| Initial Risk Assessment | Low | No Change | Potential Change to Risk Model |
| | Hi | No Change | Potential Change to Mitigation/Verification Process |

Table I compares an initial risk assessment of a seller with actual results for the seller. Table I merely provides an exemplary result and illustrates only one adaptive strategy which, in this case, is more conservatively oriented. That is, Table I merely applies the models strictly but does not take any possible corrective action if, for example, a high risk user is not suspended. Thus, the results illustrated in Table I assume the reason a high risk user has not been suspended is due to either correct verification or the risk mitigation process and not the wrong assessment of risk.

Generally, the system changes the original risk assessment model if a large enough number of low risk users are suspended. Conversely, the system changes the risk mitigation process determination algorithm if a large enough number of high-risk users get suspended. Thus, the feedback loop of FIG. 3 provides continuously active and adaptive changes in the system as needed.

Risk assessment and adaptation can occur in a number of ways. In a specific exemplary embodiment, the fine tuning and adaptation operations of FIG. 3 can include at least two methodologies: (1) extracting heuristic rules by observing the suspension patterns; and (2) feeding the data to a supervised learning algorithm based on, for example, Neural Networks.

In extracting heuristic rules, the electronic marketplace operator analyzes the post action data described above. The operator can consider patterns of fraudulent activities such as, for example, a high number of suspension or complaints from a certain range of IP addresses or e-mail addresses in certain domains, localities, or particular items placed for sale in certain categories. As the patterns are identified, the system creates rules that mark any seller or action matching the pattern as a high-risk seller. The rules typically do not retire automatically. There are a few algorithms that identify the rules that are candidates to be retired if the same adverse action stops occurring through the observed pattern. Consequently, this portion of the methodology provides for rapid reaction to outside events.

The second methodology, feeding the data to a supervised learning algorithm based on, for example, Neural Networks, typically provides a more incremental change to the risk assessment algorithms. In this case, the algorithmic inputs may be the types of parameters described above including IP, XFF, e-mail, seller history, address, phone numbers, and so on. The algorithmic output is a risk assessment level. In this case, the system adapts by changing the estimation for the values of a set of internal weights used to determine the final outcome. Applications of this branch of the second methodology are known independently to skilled artisans in other fields of learning, such as Gradient Descent Training.

Once the risk for a combination of the seller and the action is assessed, an exemplary selection algorithm can decide factors such as: (1) whether there is a verification process that the seller can complete to mitigate the risk enough so the seller can perform the intended action; and (2) if a determination is made that the process exists, making a further determination of the process to be completed. Thus, in this exemplary embodiment, the determination becomes a choice among two or more verification processes.

Figure 4:
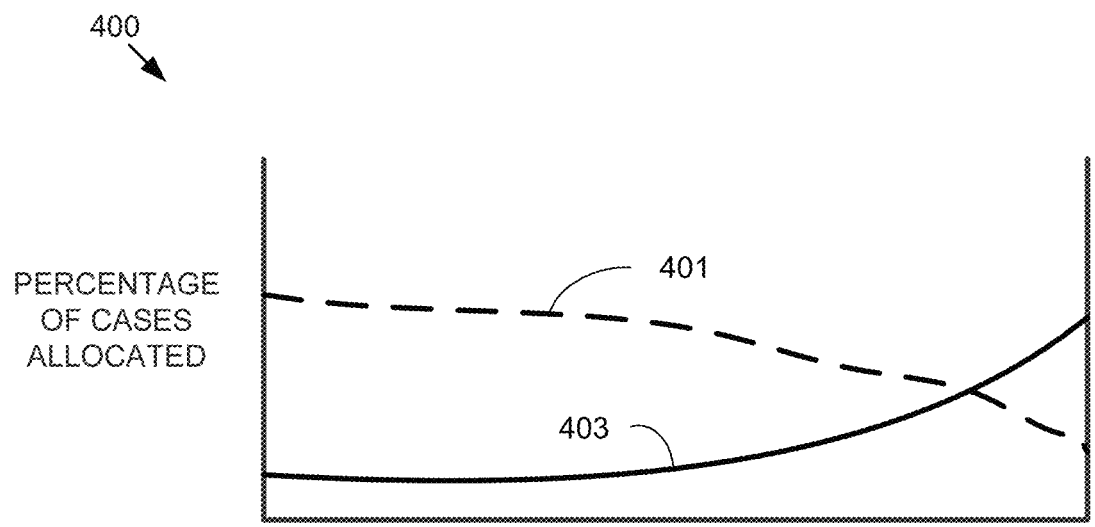
FIG. 4 is an exemplary graph illustrating two verification processes of the adaptive system of FIG. 3.

With reference now to FIG. 4, an allocation of two verification processes 400 graphically indicate a percentage of cases allocated as a function of time for a first verification process 401 and a second verification process 403. Initially, almost all cases are allocated to the first verification process 401, and only a few to the second verification process 403. The allocation may merely be based upon a random selection to yield a certain allocation of, for example, 95% to the first verification process 401 and 5% to the second verification process 403.

Figure 5:
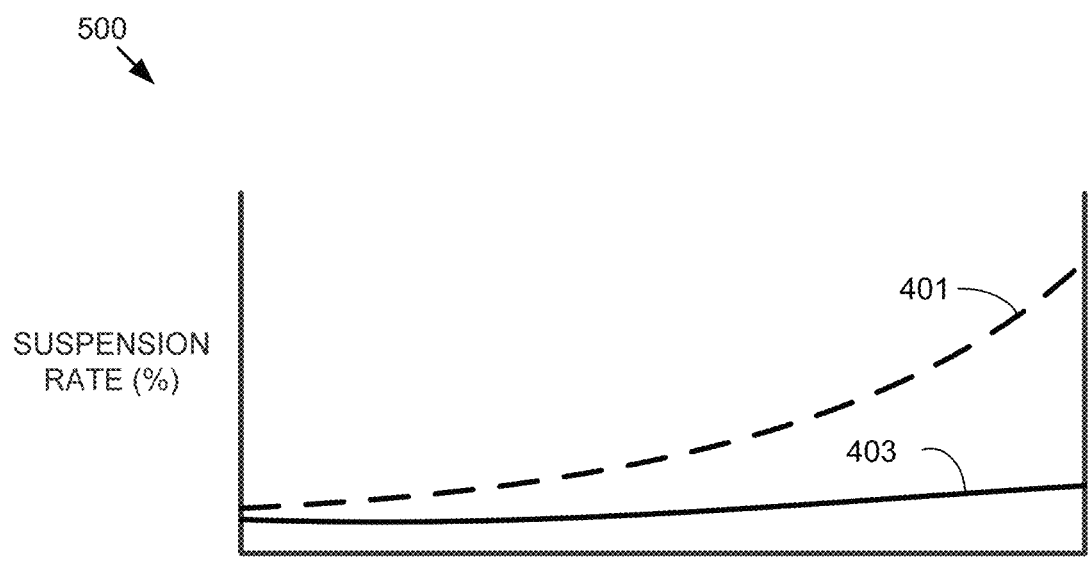
FIG. 5 is an exemplary graph illustrating observed suspension rates of the two verification processes of FIG. 4.

Concurrently in time, actual results for the first 401 and the second 403 verification processes are measured and monitored by the post action analysis subsystem 313 of FIG. 3. Actual results in terms of observed suspension rates for each of the two verification processes 500 is graphed as a function of time as illustrated in FIG. 5. Consequently, the suspension rates over, for example, a moving average window, are calculated for each of the first 401 and the second 403 verification processes. Thus, as the first verification process 401 degrades over time (i.e., more sellers who complete first verification process 401 actually get suspended or act in ways that are not expected), the number of cases allocated to the first verification process 401 is reduced and the second verification process 403 gets more cases. Thus, the adaptive risk-based verification and authentication processes are continually or periodically adapted and updated as needed.

Figure 6:
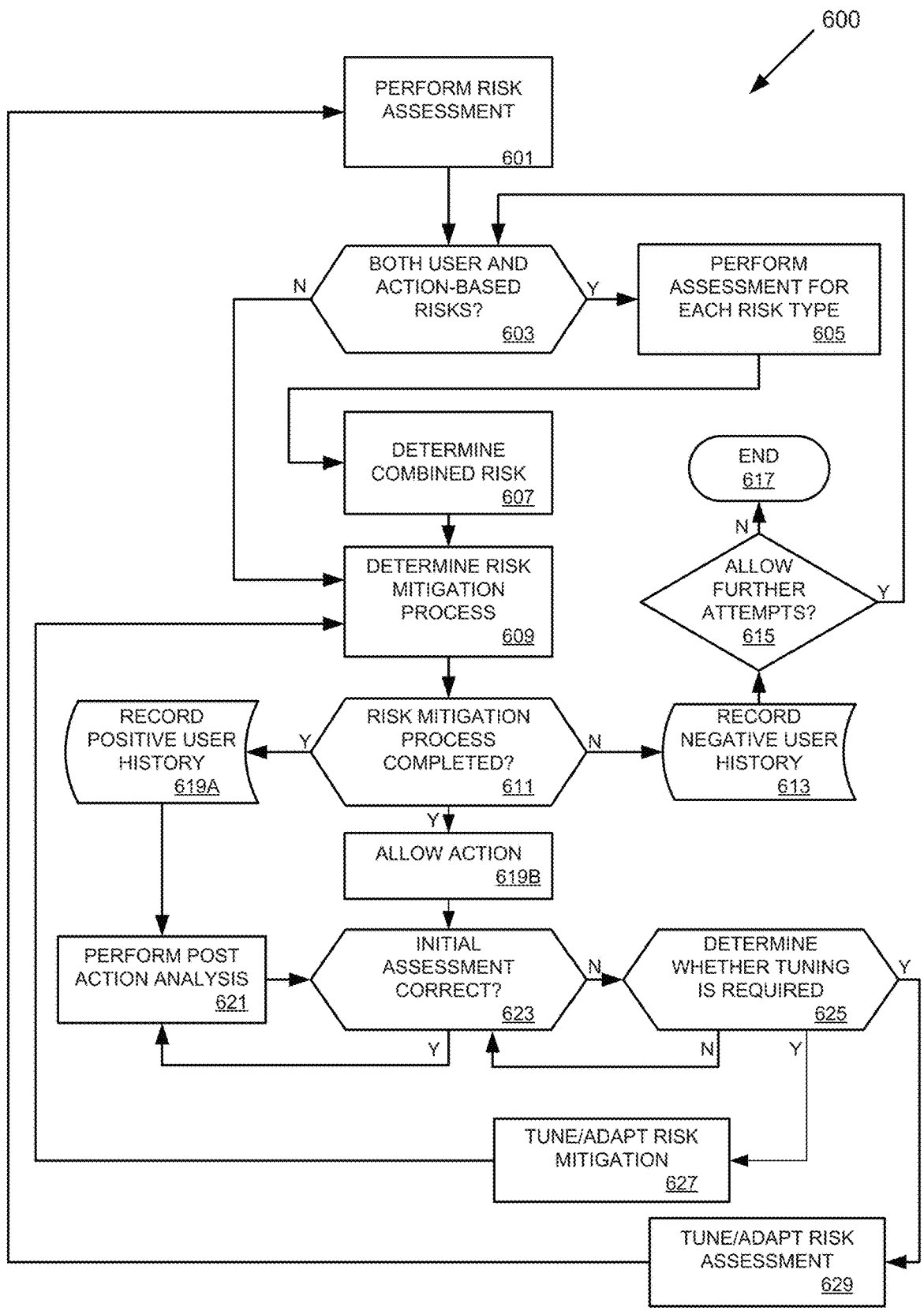
FIG. 6 is a flowchart illustrating an exemplary method 600 to perform an adaptive risk-based verification of a user in an electronic marketplace.

Referring now to FIG. 6, a flowchart illustrates an exemplary method 600 to perform an adaptive risk-based verification of a user accessing an electronic marketplace. At operation 601, a risk assessment process, applicable to the user, is started. The risk assessment process is similar to the risk assessment 303 of FIG. 3. A determination 603 is made whether the risk assessment process includes both user-based and action-based risks. If both user-based and action-based risks are to be assessed, an assessment is performed for each risk type at operation 605. Depending upon the attributes for both the user-based and action-based risks to be assessed, various weights can be applied to each of the attributes and various linear and nonlinear combinations of the weighted attributes can be determined at operation 607, as discussed above. Based upon the determination of the combined risk at operation 607, a determination of one or more risk mitigation processes for the user to perform is determined at operation 609.

If a determination is made at operation 603 that only a user-based risk is to be assessed, then a determination of one or more risk mitigation processes for the user to perform is determined at operation 609. A determination is made at operation 611 whether the one or more risk mitigation processes has been completed by the user. If the user has not performed the processes, a negative history is recorded for the user at operation 613. A further determination is then made, at operation 615, whether to allow the user further attempts to enter the electronic marketplace based on additional risk assessment determinations. If a determination is made that the user is not to be allowed further attempts, the process terminates at operation 617. However, if the user is allowed further attempts, the process continues at operation 603 with an additional determination of whether both user-based and action-based risks are to be assessed, as discussed above.

Alternatively, if the user has completed the one or more risk mitigation processes, at operation 611, a positive history is recorded for the user at operation 619A and a post action analysis is performed at operation 621. Concurrent with the positive history being recorded, the user is allowed to perform the action at operation 619B. As discussed above, the action can include buying or selling a product or service in the electronic marketplace. Based upon factors such as feedback or customer complaints about the user, a determination is made, at operation 623, whether the initial risk-assessment was correct. If the determination indicates that the initial risk-assessment was correct, then a post action analysis is performed at operation 621.

However, if the determination indicates that the initial risk-assessment performed at operation 623 was incorrect, a further determination is made whether additional tuning within the system is warranted at operation 625. If, based upon a variety of factors discussed herein that additional tuning is not required at this point, an additional and optional loop back to whether the initial risk-assessment was correct at operation 623 can be included. Concurrent with a decision that additional tuning is required and, albeit not shown explicitly, the determination then further includes a determination whether to tune or adapt the risk mitigation at operation 627 or to tune or adapt the risk assessment at operation 629. Thus, additional feedback loops are provided back for the closed loop exemplary method 600.

Therefore, while various embodiments of the present invention are described with reference to assorted implementations and exploitations, it will be understood that these embodiments are illustrative only and that a scope of the present inventions is not limited merely to those described embodiments. Moreover, the adaptive systems and methods described herein may be implemented with facilities consistent with any hardware system or hardware systems either defined herein or known independently in the art using techniques described herein. Many variations, modifications, additions, and improvements are therefore possible.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 7:
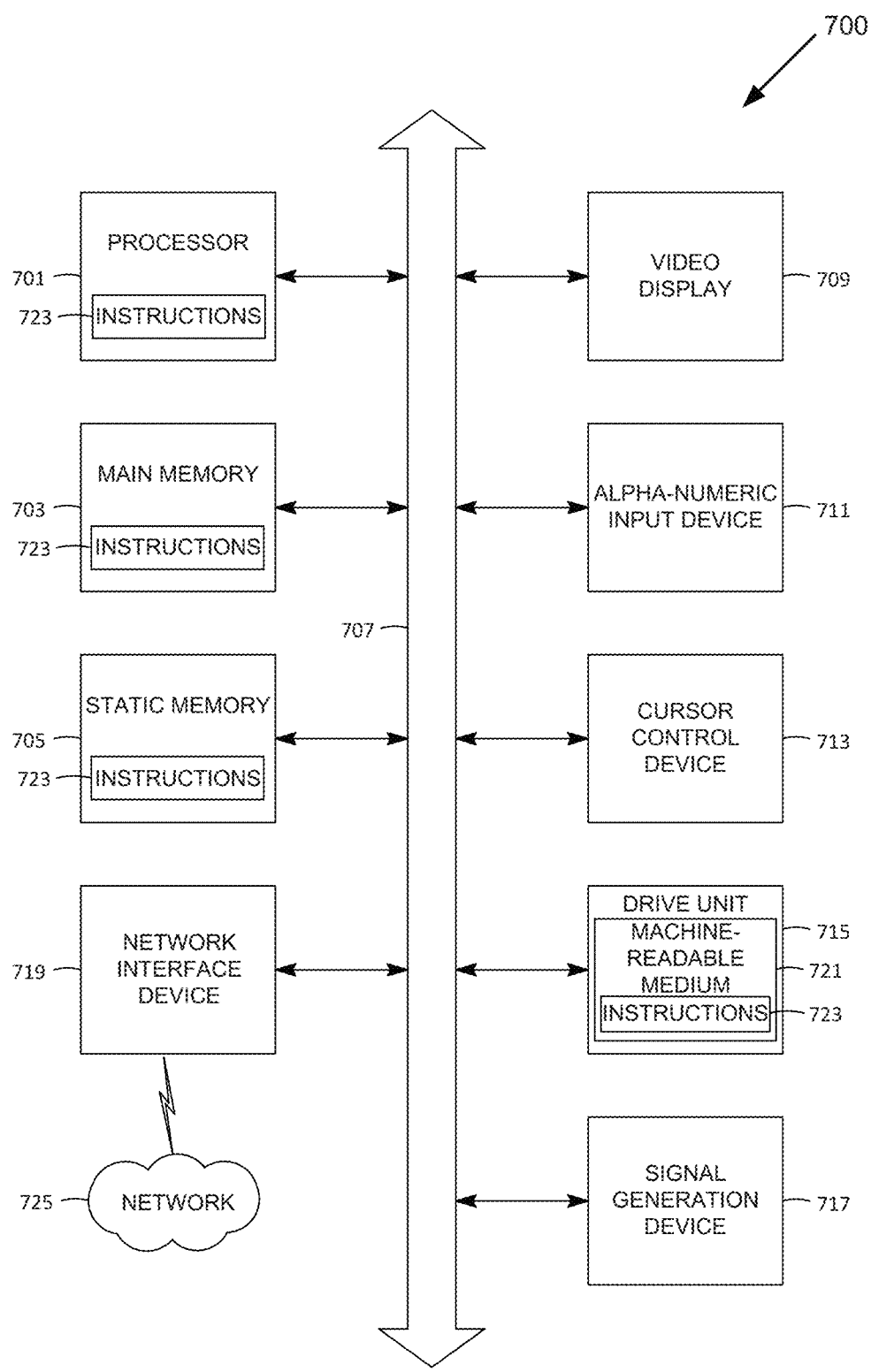
FIG. 7 is a simplified block diagram of a machine in an exemplary form of a computing system within which a set of instructions, for causing the machine to perform any one or more of the methodologies discussed herein, may be executed.

With reference to FIG. 7, an exemplary embodiment extends to a machine in the exemplary form of a computer system 700 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 701 (e.g., a central processing unit (CPU), a graphics processing unit (GPU) or both), a main memory 703 and a static memory 705, which communicate with each other via a bus 707. The computer system 700 may further include a video display unit 709 (e.g., a liquid crystal display (LCD) or a cathode ray tube (CRT)). The computer system 700 also includes an alpha-numeric input device 711 (e.g., a keyboard), a user interface (UI) navigation device or cursor control device 713 (e.g., a mouse), a disk drive unit 715, a signal generation device 717 (e.g., a speaker), and a network interface device 719.

Machine-Readable Medium

The disk drive unit 715 includes a machine-readable medium 721 on which is stored one or more sets of instructions and data structures (e.g., software instructions 723) embodying or used by any one or more of the methodologies or functions described herein. The software instructions 723 may also reside, completely or at least partially, within the main memory 703 or within the processor 701 during execution thereof by the computer system 700, the main memory 703 and the processor 701 also constituting machine-readable media.

While the machine-readable medium 721 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software instructions 723 may further be transmitted or received over a communications network 725 using a transmission medium via the network interface device 719 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of the present invention is represented by the appended claims. The specification and drawings are, accordingly, to be regarded in an illustrative rather than a restrictive sense.

What is claimed is:

1. A method to perform a risk-based assessment of a user, the method comprising:
  receiving, by a server, a request from a user to perform an action to sell an item on an e-commerce site, the request comprising search data, the item being identified in response to:
    extracting one or more words from the search data; and
    storing the extracted words in a database in association with the item;
  retrieving, by the server, a first risk assessment factor associated with the user;
  retrieving, by the server, a second risk assessment factor associated with the action on the item;
  training a neural network to implement a risk assessment model by performing training operations comprising:
    processing training data by the neural network to estimate a risk assessment level corresponding to the risk assessment model that is used to determine that the action is not permitted;
    incrementally changing internal weights of the neural network used to generate the estimate of the risk assessment level; and
    updating a final outcome produced by the neural network in response to incrementally changing the internal weights of the neural network;
  automatically determining, by the server, the action is not permitted based on a new risk assessment level generated by the risk assessment model, the risk assessment model comprising a plurality of factors including at least the first risk assessment factor and the second risk assessment factor;
  identifying a risk mitigation process from a plurality of risk mitigation processes based on the new risk assessment level generated by the risk assessment model, a first of the risk mitigation processes being associated with a first type of risk determined by the risk assessment model, a second of the risk mitigation processes being associated with a second type of risk determined by the risk assessment model, the first of the risk mitigation processes including analysis of seller feedback information, and the second of the risk mitigation processes including obtaining identity verification information from the user;
  communicating the identified risk mitigation process to the user;
  in response to communicating the identified risk mitigation process to the user, receiving, by the server, risk mitigation data from the user corresponding to the identified risk mitigation process; and
  in response to receiving the risk mitigation data from the user, automatically modifying, by the server, the risk new assessment level generated by the risk assessment model.

2. The method of claim 1, wherein the first risk assessment factor includes a user attribute, the method further comprising:
  determining that user is associated with a certain level of risk that;
  in response to determining that user is associated with the certain level of risk, obtaining the identity verification information from the user as the risk mitigation data; and
  allowing the user to sell the item on the e-commerce site in response to obtaining the identity verification information from the user as the risk mitigation data.

3. The method of claim 1, wherein the user is a seller on a multi-seller electronic marketplace.

4. The method of claim 1, wherein the second risk assessment factor includes a category for the item.

5. The method of claim 1, further comprising suspending an account of the user.

6. The method of claim 1, wherein the first risk assessment factor associated with the user is related to a number of returns.

7. The method of claim 1, further comprising:
  feeding training data to the neural network to train the neural network.

8. A system comprising:
  one or more processors of a server; and
  a non-transitory machine-readable storage medium coupled to the one or more processors, the machine-readable storage medium embodying instructions that, when executed by the one or more processors, cause the one or more processors to perform operations comprising:
    receiving, by a server, a request from a user to perform an action to sell an item on an e-commerce site, the request comprising search data, the item being identified in response to:
      extracting one or more words from the search data; and
      storing the extracted words in a database in association with the item;
    retrieving a first risk assessment factor associated with the user;
    retrieving a second risk assessment factor associated with the action on the item;
    training a neural network to implement a risk assessment model by performing training operations comprising:

processing training data by the neural network to estimate a risk assessment level corresponding to the risk assessment model that is used to determine that the action is not permitted;

incrementally changing internal weights of the neural network used to generate the estimate of the risk assessment level; and updating a final outcome produced by the neural network in response to incrementally changing the internal weights of the neural network;

automatically determining, by the server, the action is not permitted based on a new risk assessment level generated by the risk assessment model, the risk assessment model comprising a plurality of factors including at least the first risk assessment factor and the second risk assessment factor;

identifying a risk mitigation process from a plurality of risk mitigation processes based on the new risk assessment level generated by the risk assessment model, a first of the risk mitigation processes being associated with a first type of risk determined by the risk assessment model, a second of the risk mitigation processes being associated with a second type of risk determined by the risk assessment model, the first of the risk mitigation processes including analysis of seller feedback information, and the second of the risk mitigation processes including obtaining identity verification information from the user;

communicating the identified risk mitigation process to the user;

in response to communicating the identified risk mitigation process to the user, receiving, by the server, risk mitigation data from the user corresponding to the identified risk mitigation process; and in response to receiving the risk mitigation data from the user, automatically modifying, by the server, the new risk assessment level generated by the risk assessment model.

9. The system of claim 8, wherein the first risk assessment factor comprises a geographic location of the user, and wherein the identified risk mitigation process comprises placement of a verified e-mail address on file with the e-commerce site, placing a credit card on file with the e-commerce site, and completing a geographic based identity verification process including an address of the user.

10. The system of claim 8, wherein the user is a seller on a multi-seller electronic marketplace, and wherein the operations comprise requesting that the user perform the identified risk mitigation process in response to determining that the action is not permitted.

11. The system of claim 8, wherein the operations further comprise suspending an account of the user.

12. The system of claim 8, wherein the first risk assessment factor associated with the user is related to a number of returns.

13. The system of claim 8, wherein the risk assessment model is a machine learning model.

14. A non-transitory machine-readable storage medium including a plurality of instructions that, when executed by one or more processors of a server, causes at least one of the one or more processors to perform operations comprising:

receiving, by a server, a request from a user to perform an action to sell an item on an e-commerce site, the request comprising search data, the item being identified in response to:

extracting one or more words from the search data; and storing the extracted words in a database in association with the item;

retrieving a first risk assessment factor associated with the user;

retrieving a second risk assessment factor associated with the action on the item;

training a neural network to implement a risk assessment model by performing training operations comprising:

processing training data by the neural network to estimate a risk assessment level corresponding to the risk assessment model that is used to determine that the action is not permitted;

incrementally changing internal weights of the neural network used to generate the estimate of the risk assessment level; and updating a final outcome produced by the neural network in response to incrementally changing the internal weights of the neural network;

automatically determining, by the server, the action is not permitted based on a new risk assessment level generated by the risk assessment model, the risk assessment model comprising a plurality of factors including at least the first risk assessment factor and the second risk assessment factor;

identifying a risk mitigation process from a plurality of risk mitigation processes based on the new risk assessment level generated by the risk assessment model, a first of the risk mitigation processes being associated with a first type of risk determined by the risk assessment model, a second of the risk mitigation processes being associated with a second type of risk determined by the risk assessment model, the first of the risk mitigation processes including analysis of seller feedback information, and the second of the risk mitigation processes including obtaining identity verification information from the user;

communicating the identified risk mitigation process to the user;

in response to communicating the identified risk mitigation process to the user, receiving, by the server, risk mitigation data from the user corresponding to the identified risk mitigation process; and in response to receiving the risk mitigation data from the user, automatically modifying, by the server, the new risk assessment level generated by the risk assessment model.

15. The non-transitory machine-readable storage medium of claim 14, wherein the first risk assessment factor includes a user attribute.

16. The non-transitory machine-readable storage medium of claim 14, wherein the user is a seller on a multi-seller electronic marketplace.

17. The non-transitory machine-readable storage medium of claim 14, wherein the second risk assessment factor includes a category for the item.

18. The non-transitory machine-readable storage medium of claim 14, wherein the one or more words that are extracted comprise aspect-value pairs.

19. The non-transitory machine-readable storage medium of claim 18, the operations comprising applying aspect rules to the item to identify aspect-value pairs associated with the item, the aspect rules being applied as items are added to the e-commerce site.

* * * * *